Jan. 22, 1946. T. BAILEY 2,393,454
SUGAR DISPENSER
Filed April 5, 1944 2 Sheets-Sheet 1

Theodore Bailey INVENTOR.

BY

*Victor J. Evans & Co.*
ATTORNEYS

Jan. 22, 1946. T. BAILEY 2,393,454
SUGAR DISPENSER
Filed April 5, 1944  2 Sheets-Sheet 2
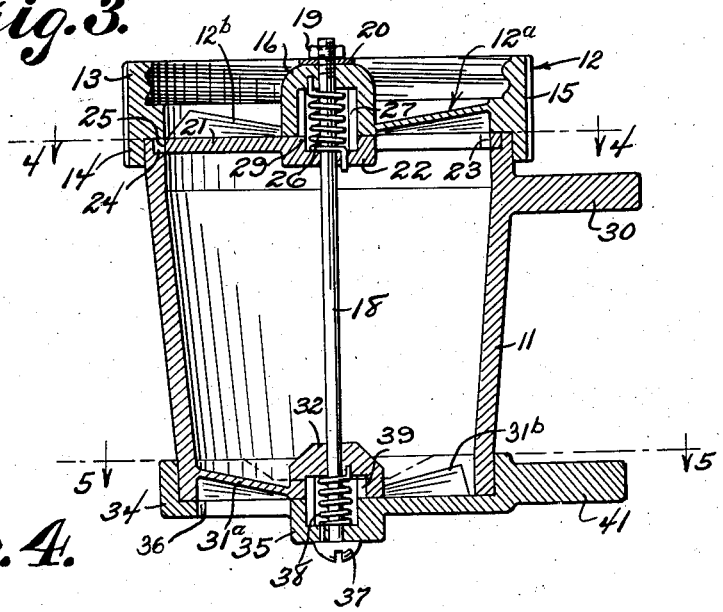
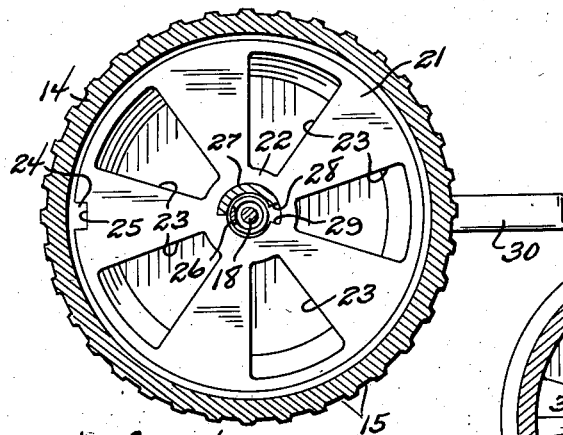
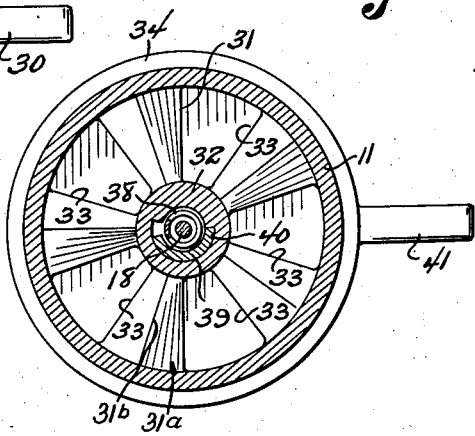
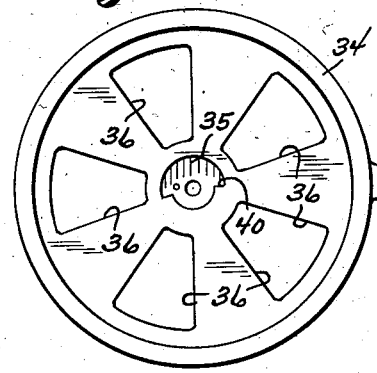
Theodore Bailey
INVENTOR.
BY
*Victor J. Evans & Co.*
ATTORNEYS Patented Jan. 22, 1946

2,393,454

UNITED STATES PATENT OFFICE 2,393,454

SUGAR DISPENSER

Theodore Bailey, Habana, Cuba

Application April 5, 1944, Serial No. 529,645

3 Claims. (Cl. 222—158)

The invention relates to measuring and dispensing devices generally, and more particularly to a type thereof that is designed for household use, in the measuring and dispensing of granular and pulverulent materials, such as sugar, flour and the like.

An object of the invention is to provide a device of this kind and one that is highly efficient in the dispensing of granular or pulverulent materials in accurately measured quantities, suitable to meet the demands of fine crockery, particularly in households, boarding houses and the like, and which is capable of being manufactured at a comparatively low cost.

Another object of the invention has to do with the provision of a device of the character mentioned, that is in the nature of an attachment for certain standard forms of containers, such as glass jars and the like, so that the same may be readily removed from and replaced on a container for the replenishment of the content of the latter and for cleaning purposes.

A further object of the invention resides in the provision of a container and a measuring and dispensing attachment combination for maintaining a plentiful supply of a granular or pulverulent material in a sanitary condition and a state of readiness for instant use at all times, the parts, container and attachment being preferably made of transparent materials, such as glass or a plastic, or a combination of both, for cheapness in manufacture and to expose the content to view for instant information as to the amount of material available for use and of the proper feed of the material into and through the attachment from the container.

With these and other objects of equal importance in view, the invention resides in the certain new and useful combination, construction and arrangement of parts, as will be hereinafter more fully described, set forth in the appended claims, and illustrated in the accompanying drawings, in which:

Figure 3 is a vertical section taken on the line 3—3 of Figure 2;

Figure 4 is a horizontal section taken on the line 4—4 of Figure 3;

Figure 5 is a view similar to that of Figure 4, but taken on the line 5—5 of Figure 3; and Figure 6 is a top plan view of the lower of the elements for controlling the discharge of a measured quantity of material from the cup of the attachment, the same being shown apart from its mounting on the cup.

Figure 1:
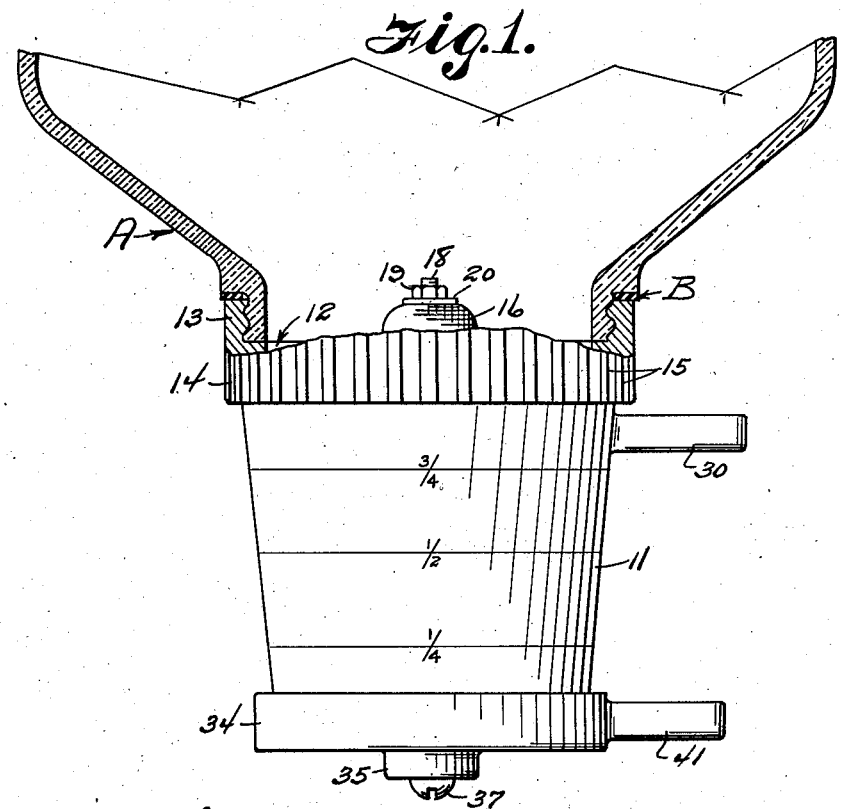
Figure 1 is a front elevation of the device, in accordance with the invention, and showing the attachment in its operative relation to a container, the latter and the connected part of the attachment being in section.
Figure 2:
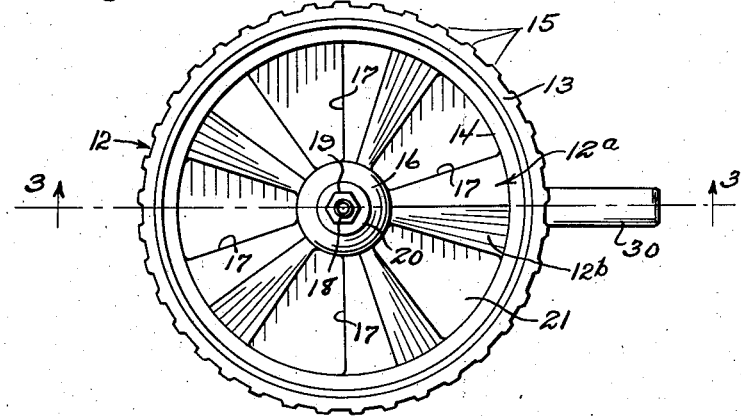
Figure 2 is a top plan view of the attachment per se.

Referring to the drawings, wherein like characters of reference denote corresponding parts throughout the several views, the embodiment of the invention, as is exemplified therein, is comprised in a cup 11 that preferably takes the form of an inverted conic frustum which is open at both ends and is mounted for limited rotative movement relative to an attaching member 12 from which it is supported. The attaching member 12 is comprised in a wall portion 12$^a$ that is bounded at its upper and lower sides by annular flanges 13 and 14, the upper flange 13 being screw-threaded at its inner side for engagement with the complementally screw-threaded mouth portion of an inverted container A, preferably with a rubber band or the like B interposed therebetween, while the lower flange 14 is engaged over the upper (larger) end of the cup 11. The exterior surface of the ring formed by the flanges 13 and 14 is preferably provided with a series of vertical ridges of the like 15, or otherwise roughened, to facilitate the turning movements of the attaching member 12 necessary for its engagement with or removal from the container mouth. The top side of the wall 12$^a$ of the attaching member 12 is dished inwardly from a point adjacent the upper flange 13 and about a centrally enlarged portion 16 outwardly from which a series of equidistantly spaced openings 17 are formed in the wall for the passage of material from the container A downwardly therethrough when required. Those parts 12$^b$ of the wall 12$^a$ between the openings 17 are of inverted V-form in cross section. The enlarged portion 16 is made hollow and its interior is fully open through the lower side of the wall 12, while its top end wall is apertured to receive the upper end of a shaft 18 upon which the cup 11 is mounted for the aforesaid limited rotative movements. The shaft 18 preferably takes the form of a bolt having a retaining nut 19 on its upper end and a washer 20 interposed between the nut and the top end wall of the enlarged portion 15.

Fitted into the upper end of the cup 11 is a flat plate 21 that is formed with a centrally depressed portion 22 and a series of radially disposed openings 23 corresponding in number to that of the openings 17 in the wall 12ᵃ of the attaching member. With the cup 11 in place on the shaft 18, the end or valve plate 21 directly underlies the bottom side of the wall 12ᵃ, and the openings 23 are normally out of registry with the openings 17, so that material from the container A is prevented from discharge therethrough until a portion of the same is to be measured and dispensed. The end plate 21 is rotatable with the cup 11 through the medium of a lug 24 formed at the inner side of the latter and engaged in a recess 25 formed in the periphery of the former, so that the openings 23 of the end plate will be moved into and out of registry with the openings 17, of the wall 12ᵃ of the attaching member 12, when the cup is shifted from one to the other of its positions. A coil spring 26 is positioned on the shaft 17 and is partially housed within the enlarged portion 16 of the wall 12ᵃ, and has its lower end seated within the depressed portion 22, of the end plate 21, with its upper end secured in the top wall of the enlarged portion 16 and its lower end in the bottom wall of the depressed portion 22. Secured within the interior of the enlarged portion 16, about the spring 26, is a sleeve 27 which has a portion of its lower end cut away, as at 28 (Figure 4) to form a slotway for a lug 29 projecting from the side wall of the depressed portion 22; the slotway being proportioned to limit the movement of the stop lug 29 with the cup 11 sufficiently only to allow the discharge openings 23, of the end plate 21, to be moved into and out of registry with the discharge openings 17 in the wall 12ᵃ of the attaching member 12 mounted on the mouth of the container A. A handle 30 is provided on the cup at a point just below its upper end for its manipulation to position to place the discharge openings 23 in the end plate 21 in registry with the discharge openings 17. The turning movement of the cup 11 increases the torsion of the spring 26 and results in a quick automatic return of the cup to normal position, upon the release of the handle 30 by the operator.

The lower end of the cup 11 is provided with a dished wall 31 which is likewise formed to provide a centrally enlarged portion 32 and a series of radially disposed discharge openings 33, corresponding in number and arrangement to those in the wall 12ᵃ of the attaching member 12 engaged with the mouth of the container A. Those portions 31ᵃ of the wall 31 located between the openings 33 are of inverted V-form in cross section. Engaged over the lower end of the cup 11 is a valve plate 34 that is also formed to provide a centrally depressed portion 35 in line with the enlarged portion 32 and a series of radially disposed discharge openings 36 which are to be moved into and out of registry with the openings 33, when the valve plate is rotated relatively to the cup. The shaft 18 is passed upwardly through aligned apertures formed in the bottom wall of the depressed portion 35 and the top wall of the enlarged portion 32, so that its headed end 37 supports the valve plate 34 against the lower end of the body 11. Housed within the enlarged portion 32 and the depressed portion 35 is a coil spring 38 that has its upper end secured in the top wall of the former and its lower end in the bottom wall of the latter. Also housed within the enlarged portion 32 about the coil spring 38 is a semi-circular element 39 that has its lower end depending within the depressed portion 35 for cooperation with a similarly shaped thickened portion 40 of the side wall of the latter, the portion 40 having a lesser arc length than the element 39 to permit of a rotative movement of the valve plate 34 sufficiently only to shift the discharge openings 36 into and out of registry with the discharge openings 33. The valve plate 34 is provided with a radially extending handle 41 for its rotative manipulation to place the discharge openings 36 in registry with the discharge openings 33, the torsion effort of the spring 38 acting to return the valve plate to its normal cut off position, when the handle 41 is released by the operator.

The container A can be of any standard or special size, square or round, and made of any suitable transparent material, or otherwise take the form of the glass jar that is commonly employed in canning and preserving operations. Likewise, the attachment with the exception, for instance, of the shaft 18 and its associated parts may be made from any suitable transparent material, although one of the several available plastics is preferred. The cup 11 is preferably made to have a capacity of a cup that is ordinarily employed in household kitchens and has its side wall provided with a scale of graduations denoting ¼; ½ and ¾ proportions of the whole unit of measurement, the scale being positioned, with reference to the handles 30 and 41, for ready observation by the operator.

In operation, with the attachment secured on the mouth of the container A, which may be conveniently supported within a kitchen cabinet (not shown) or from a wall, the operator will grasp the handle 30 and turn the cup 11 relatively to the attaching member 12 from which it is cooperatively supported and until the stop lug 29 abuts the end of the slotway 28, when the discharge openings 23, in the end plate 21, will be in registry with the discharge openings 17 in the wall 12ᵃ and material from the container A will gravitate into the cup 11. As soon as the material reaches a selected graduation on the scale, the operator will release the handle and the spring 26 will immediately snap the cup back to its initial position, moving the discharge openings 23 out of registry with the discharge openings 17, thus cutting the flow of material from the container. Following this, the operator now grasps the handle 41 and turns the valve plate 34 relatively to the cup 11, thus placing the discharge openings 36 in registry with the discharge openings 33, when the measured material will flow from the cup and into a receptacle (not shown) held or placed immediately beneath the lower end of the cup. Upon releasing the handle 41, the spring 38 will quickly return the valve plate 34 to its cut off position, with the discharge openings 36 out of registry with the discharge openings 33. The parts 16 and 22 provide a housing for the spring 26, and the parts 32 and 35 provide a housing for the spring 38.

Having thus fully described my invention, it is to be clearly understood that various changes in design and minor structural details may be resorted to, without departing from the spirit of the invention or its scope as claimed.

What I claim is:

1. The combination with a container having an open mouth, of a measuring and dispensing device attached to and supported thereby, and including a cup having an upper open end, a top valve plate supported in the open end of the cup and having dispensing openings therein, an attaching member adapted to be engaged over the open mouth of the container and having a wall with dispensing openings therein and an enlarged hollow central portion, the top valve plate having a depressed portion registering with the hollow enlarged portion to form a housing, and the openings in the top valve plate adapted to register with the openings in the wall of the attaching member, the bottom of the cup having a wall formed with dispensing openings, a bottom valve plate over the bottom of the cup having dispensing openings adapted to register with those in the bottom wall, hollow members in the bottom wall and the bottom valve plate registering to form a housing, a shaft passing through the housing and through the cup to rotatably support the cup from the attaching member over the mouth of the container, and to rotatably support the bottom valve plate with respect to the cup, and a pair of springs, one in each housing, designed to normally hold the cup and the bottom valve plate respectively in position where the openings in the valve plates will be out of registry with those in said walls.

2. The invention as defined in claim 1 wherein the bottom wall of the attaching member over the mouth of the container, the top valve plate, the bottom wall of the cup, and the bottom valve plate are all circular and have registering valve openings radiating from a common central point in the cup and the walls and valve plates, and wherein the wall of the attaching member and the wall at the bottom of the cup are dished.

3. The invention as defined in claim 1 wherein the respective springs are carried about the shaft, one end of the upper spring being fixed with respect to the attaching member, and the other end connected with the top valve plate, and one end of the other spring being fixed with respect to the bottom wall of the cup, and its other end connected with the bottom valve plate, and wherein stops are provided for the cup and the valve plate respectively.

THEODORE BAILEY.